(12) United States Patent  (10) Patent No.: US 6,298,449 B1
Carter  (45) Date of Patent: Oct. 2, 2001

(54) APPARATUS AND METHOD FOR HIGH RELIABILITY PC PLATFORM TELECOMMUNICATIONS SYSTEMS

(75) Inventor: George E. Carter, Santa Clara, CA (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/127,121

(22) Filed: Jul. 29, 1998

(51) Int. Cl.$^7$ .................................................... G06F 1/28
(52) U.S. Cl. ............................. 713/340; 714/14; 714/22
(58) Field of Search ........................... 713/300, 2, 340; 714/6, 40, 14, 22, 2; 709/222; 711/173; 361/86

(56) References Cited

U.S. PATENT DOCUMENTS

| | | | |
|---|---|---|---|
| 5,410,706 | * | 4/1995 | Farrand et al. ............................. 713/2 |
| 5,623,596 | | 4/1997 | Townsley et al. ............... 395/182.12 |
| 5,680,547 | * | 10/1997 | Chang .................................... 709/222 |
| 5,691,870 | | 11/1997 | Gebara ..................................... 361/86 |
| 5,812,754 | * | 9/1998 | Lui et al. ................................... 714/6 |
| 5,909,583 | * | 6/1999 | Hayes et al. .......................... 713/300 |
| 5,925,131 | * | 7/1999 | Novoa et al. ......................... 713/300 |
| 5,978,912 | * | 11/1999 | Rakavy et al. .............................. 713/2 |
| 5,991,860 | * | 11/1999 | Gross et al. ........................... 711/173 |
| 6,000,042 | * | 12/1999 | Henrie .................................... 714/40 |
| 6,170,062 | * | 1/2001 | Henrie .................................. 713/340 |

* cited by examiner

Primary Examiner—Meng-Al T. An
Assistant Examiner—Jungwon Chang (57) ABSTRACT

An integrated reliability enhancement device for providing high reliability operation of a personal computer is preferably embodied in an add-in card for insertion into a bus slot of the personal computer. The add-in card includes monitoring circuitry for detecting an array of events associated with operational failure of the computer including failure of a cooling fan, out-of-range temperature fluctuations within the computer housing, out-of-range deviations in power supply input voltage, out-of-range deviations in power supply output voltage, and out-of-range deviations in line current consumption by the computer. Upon detection of one of the events, data associated with the failure is written into an add-in card memory which is accessed periodically by application software of the host computer. The application software can be configured to respond to detection of the event by executing any combination of notification procedures, which include writing event data into a host computer error log memory, displaying a message on a host computer monitor, transmitting a simple network protocol SNMP message via a local area network, enabling a relay contact alarm output on the add-in card, and transmitting a message from a service modem on the add-in card. A plain-old-telephone service (POTS) line interface on the add-in card enables a remote user to access event data from the add-in card memory and to enable a remote reboot control to reboot the host computer. A power supply control automatically enables a secondary power supply in response to detection of a primary power supply failure by the monitoring circuitry.

18 Claims, 6 Drawing Sheets

APPARATUS AND METHOD FOR HIGH RELIABILITY PC PLATFORM TELECOMMUNICATIONS SYSTEMS

BACKGROUND OF THE INVENTION

The invention relates generally to systems and methods for providing high reliability operation of personal computers and, more specifically, the invention relates to increasing operational reliability of personal computers which support telecommunications systems.

DESCRIPTION OF THE RELATED ART

Telecommunications customers who have a requirement for sophisticated large communications services have traditionally met the requirement through private branch exchanges (PBX). Corporate customers requiring a telecommunications system for an office complex that houses a large number of employees within multiple different departments are likely to employ a PBX for their telecommunications requirements, rather than relying on the public switch telephone network (PSTN). As a practical matter, relying on the PSTN provides the customer with less control and flexibility with regard to updating and reconfiguring the telecommunications system because the telephone company owns and operates much of the telecommunications hardware, such as cables and the central office switch. In contrast, a PBX user owns the telecommunications equipment. Furthermore, the customer does not incur charges on internal calls within the PBX, which can be significant if the customer's internal call traffic level is high. Because PBXs provide important functions on which corporate customers heavily rely in conducting business, PBXs have been designed for high operational reliability.

With the advent of powerful and relatively inexpensive personal computers (PC), some of the functions traditionally performed by PBX's are now being performed by telecommunications PC platforms. These telecommunication PC platforms are especially well adapted for emerging communication media such as internet protocol (IP) telephony, also known as voice over IP. However, PCs have not traditionally been designed to meet the same high reliability requirements which PBXs have been designed to meet.

A partial solution to the reliability problem is described in U.S. Pat. No. 5,691,870 to Gebara which discloses a circuit which monitors and disables power supply signals to a microprocessor in a computer system that utilizes a main power supply and secondary voltage regulators. The circuit detects whether the voltages supplied by the secondary voltage regulators to the microprocessor fall within a predetermined range that is governed by microprocessor requirements. If the supply voltage falls outside the predetermined range, the circuit causes the main supply voltage to short to ground. As a result, the main power supply is shut down, thereby removing all power supply voltages to the microprocessor. Although the circuit is effective for detecting supply voltage deviations outside of an acceptable range, the circuit does not address an array of reliability concerns unrelated to supply voltage deviations.

What is needed is a system for providing increased operational reliability in telecommunications PC platforms.

SUMMARY OF THE INVENTION

An integrated reliability enhancement device adapted for cooperative interaction with a host computer includes monitoring circuitry capable of recognizing an array of conditions associated with host computer failure, multiple remote notification devices capable of notifying remotely located devices that one of the failure conditions has been recognized, a remote rebooting controller for rebooting the host computer in response to a remotely generated request, and a power supply controller adapted for automatically switching to a secondary power supply upon failure of a first power supply.

In a preferred embodiment, the integrated reliability enhancement device is primarily incorporated into an add-in card for installment into a bus slot of the host personal computer (PC). Alternatively, the enhancement device can be primarily incorporated into a stand-alone device for connection to the computer as a peripheral device. The enhancement device can be configured to operate on behalf of a PC-based PBX, voice mail, internet telephony servers, automatic call director servers, "find me" servers, and network management monitoring equipment. The monitoring circuitry includes fan fault detection circuitry capable of detecting a fault in the operation of a cooling fan in the host computer. A multimeter chip is provided which cooperates with a thermistor to detect fluctuations of temperature within the computer housing which exceed a predetermined range. The multimeter chip also enables detection of voltage fluctuations in excess of a predetermined range of power supply input line voltage to the host computer, fluctuations in line current consumption by the host computer, and the voltage level of the power supply output. The monitoring circuitry enables detection of temperature and power supply abnormalities that are associated with operational malfunctions of the host computer. Upon detection of fan failure, out-of-range internal temperature, or power supply abnormality, the monitoring circuitry writes data representative of the detected condition into an enhancement device memory.

Application software on the host computer periodically accesses data from the enhancement device memory to determine if any temperature, power supply, or fan failure events have been detected. If the application software reads data from the register indicative of one of these events, the application software is configured to execute a preselected form of notification. Data representative of a detected event can be written into an error log of the host computer, a message can be displayed on a monitor of the computer, or a message can be transmitted over a data network to which the host computer is connected. In a preferred embodiment, the transmitted message is in the form of a simple network management protocol (SNMP) message. The preferred form of notification depends on the urgency associated with the particular abnormality which has been detected. For instance, if a relatively slight deviation in internal temperature is detected, an entry might be made in the error log, whereas a power failure might additionally result in transmission of an SNMP alarm message.

The enhancement device itself has notification capabilities which are responsive to detection of predetermined events. A relay contact alarm output provides a direct connection from the enhancement device to an external alarm power relay. A service modem can be configured to automatically dial out to a remote device and transmit event data to the remote device upon being activated. Both the relay contact alarm output and the service modem are activated by the host application software upon reading specific event data from a register on the add-on card. The application software can be configured to selectively enable any combination of the notification capabilities, including the host computer error log, the computer monitor message display, the SNMP messaging, the service modem, and the relay contact alarm output, depending on the specific event that has been detected.

In the preferred embodiment, the enhancement device further includes a power supply controller which is responsive to detection of a failure of a first power supply. The power supply controller automatically enables a second power supply upon detection of the first power supply failure. A remote reboot controller enables a remote user to reboot the host computer as a last resort to restoring normal operation of the host computer if no other options are available. Also in the preferred embodiment, the user has two means for accessing the remote reboot controller; through host computer software addressing the enhancement device as a serial port and through a communications network interface on the enhancement device, such as a plain-old-telephone service (POTS) line interface. The serial port might be accessed via a local area network (LAN) card which connects the host computer to a LAN. The concern is that the computer malfunction which necessitates rebooting of the computer might itself prevent the remote user from accessing the remote reboot controller via the LAN card. The POTS line interface, being operationally independent of the host computer, enables access to the reboot controller even during severe operational malfunctions of the computer. In a preferred embodiment, the add-in card modem provides the remote user access to the event data in the register so that the user is in a better position to determine the necessity of rebooting the computer.

DETAILED DESCRIPTION

Figure 1:
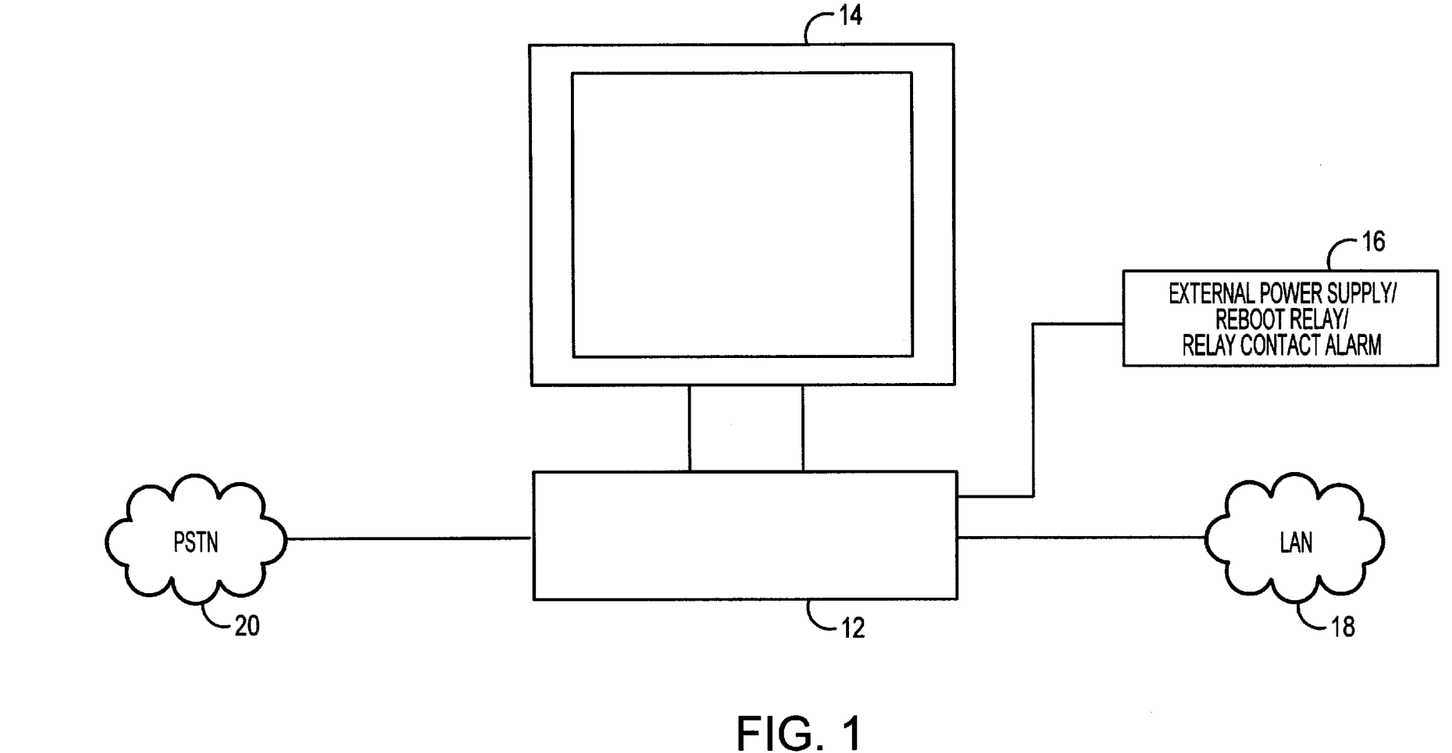
FIG. 1 is a schematic diagram of a personal computer which utilizes a reliability card of the current invention.

With reference to FIG. 1, a personal computer 12 employing a system for high reliability operation according to the present invention is connected to a data network, such as a local area network (LAN) 18 and to a public switch telephone network (PSTN) 20. The computer includes a monitor 14. An external box 16 houses first and second power supplies which provide the computer with a redundant power supply in the event of a power failure. The external box also contains an alarm power relay which enables a user of the computer to configure an alarm system responsive to detection of predetermined events associated with computer failures. The reboot power relay within the external box allows the computer to be rebooted from a remote location. Typically, one or both of the power supplies are internal to the computer.

In addition to standard operations, the connection to the LAN 18 is utilized to transmit alarm messages, for instance in the form of SNMP messages, to provide remote notification of recently detected events or conditions associated with a host computer failure. The connection to the PSTN 20 enables access by a remotely located device, such as a computer or a telephone (not shown), to stored data of detected events associated with detected host computer failures. The PSTN connection also enables a user of the remote device to initiate a rebooting of the host computer. In a preferred embodiment, the system for high reliability operation is employed in a personal computer supporting a telecommunication platform. Alternatively, the system can be employed in any computer which requires a high level of operational reliability.

Figure 2:
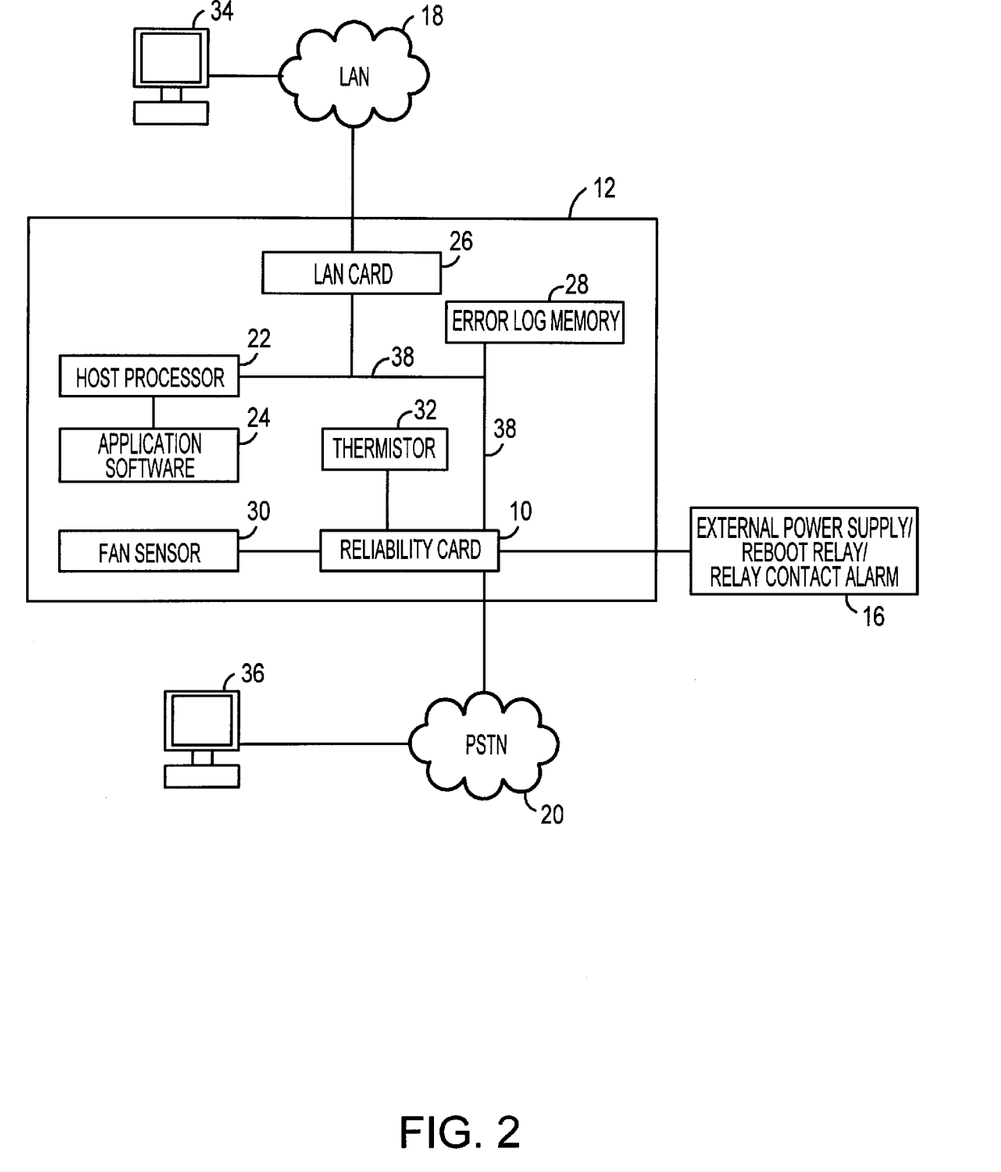
FIG. 2 is a block diagram of the interrelating components of the personal computer shown in FIG. 1, the reliability card, and an external power supply/reboot relay/relay contact alarm.

Referring to FIG. 2, the host computer 12 includes a reliability card 10 which includes circuitry for monitoring certain aspects of the host computer for events associated with operational failure of the host computer. In a preferred embodiment, the reliability card is capable of being inserted into a bus slot which connects the reliability card to the host computer via a bus 38. Alternatively, the reliability card can be incorporated into a stand-alone device connected to the computer as a peripheral device. A thermistor 32 provides data to the reliability card regarding internal temperature in the host computer 12 and a fan sensor 30 monitors operation of a cooling fan housed in the host computer. As will be discussed in greater detail below, the reliability card also includes circuitry for monitoring line voltage to the computer, line current consumption by the computer, and power supply output voltage. In association with application software 24, a host processor 22 accesses data of detected events from the reliability card 10. The application software determines whether the event data requires execution of a notification procedure.

One of the notification procedures includes writing an entry into an error log memory 28. An entry includes data regarding detection of any event associated with a host computer failure in order to maintain a record of the failure-associated events. If a detected event is relatively insignificant, the entry into the error log memory might be the only action undertaken by the application software 24. If the event is more serious, the application software can cause a message to be displayed on the computer monitor 14 in order to provide more immediate notification. A LAN card 26 enables the host computer 12 to transmit an alarm message to a first remotely located computer 34 on the LAN 18. In a preferred embodiment, the message is in the form of an SNMP message. A LAN administrator at the remotely located computer can take the appropriate steps to return the host computer to proper operation.

Additionally, the reliability card 10 itself is able to execute remote notification procedures at the direction of the application software 24. The reliability card is able to support a connection via the PSTN 20 to a remotely located monitoring computer 36 over which an alarm message can be transmitted. The reliability card includes a connection to the alarm power relay in the external box 16. As will be discussed in greater detail below, the reliability card is able to activate the alarm power relay to enable an alarm system in response to detection of predetermined events.

Figure 3:
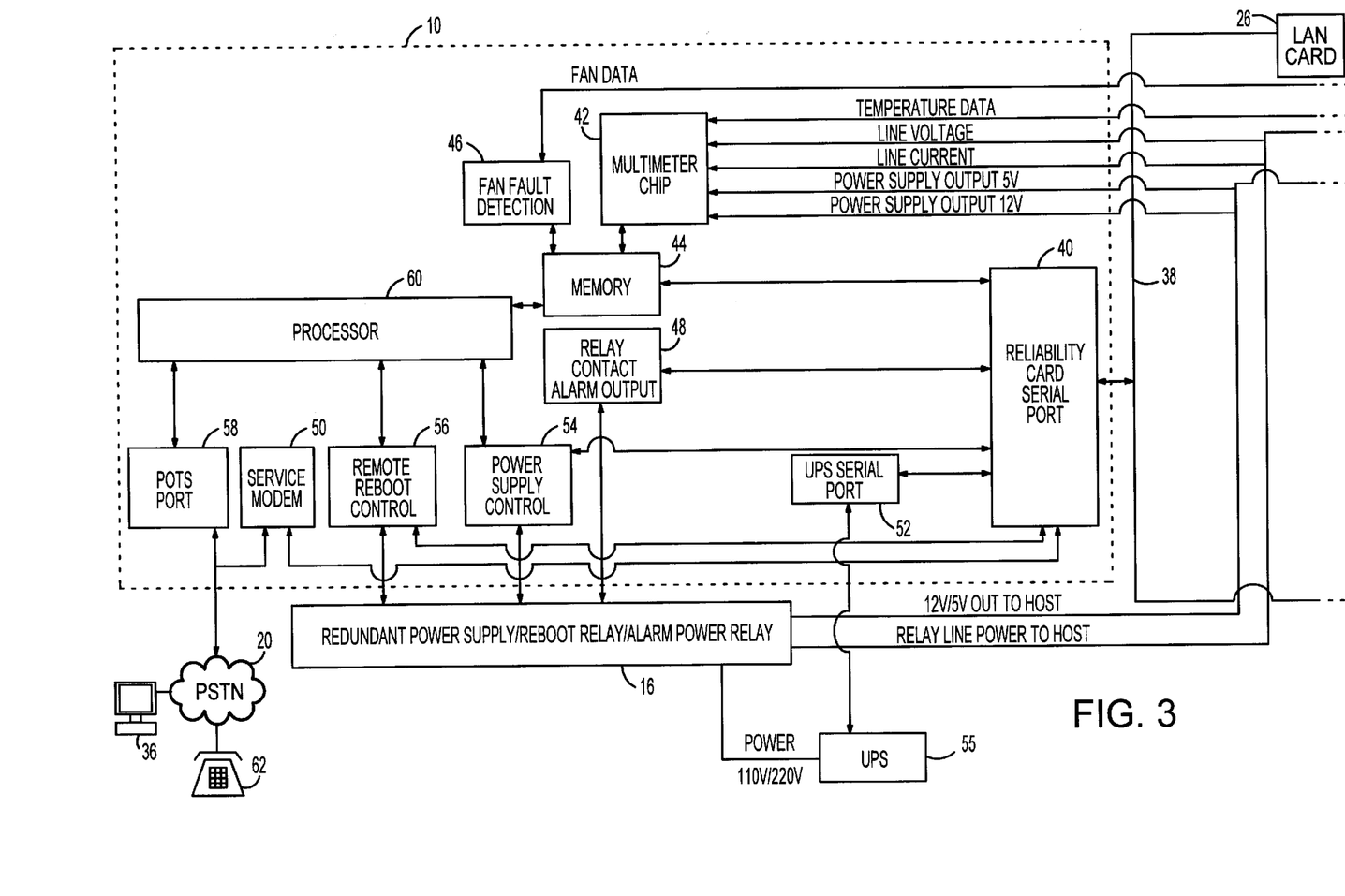
FIG. 3 is a block diagram illustrating the operational interrelationship of the components of the reliability card shown in FIG. 2.

With reference to FIGS. 2 and 3, the reliability card 10 includes a multimeter chip 42 which enables detection of conditions associated with computer failure, such as high temperatures within the computer housing, deviations in line voltage to the computer, deviations in line current consumption by the computer, and deviations in power supply output voltage. The design of an acceptable embodiment of the multimeter chip is known in the art and will not be discussed in detail herein.

A thermistor 32, which is located within the computer housing at a location that is sensitive to temperature fluctuations, measures temperature and transmits temperature information to the multimeter chip in analog form.

The multimeter chip converts the analog temperature value to a digital form, and, if the measured temperature is outside of a prescribed range, the temperature data is time stamped and written into memory 44 of the reliability card. The application software 24 periodically reads the temperature data from the memory via a reliability card serial port 40 connected to the host computer bus 38. After the application software reads the temperature data, the temperature data is cleared from memory. In a preferred embodiment, the memory is non-volatile so that, in the event of a power failure, a record exists of at least the last temperature reading prior to power failure.

If the line voltage to the computer deviates from an acceptable range, erratic system operation, including rebooting of the computer, is likely. The acceptable range of the line voltage is a function of the particular power supply used. Deviation of line current consumption by the host computer 12 is a strong indication of a computer failure, the particular acceptable range being dependent on the computer in which the reliability card resides. The multimeter chip can measure the 12 volt and 5 volt outputs of a conventional computer power supply and detect voltage deviations of both outputs which are outside of an acceptable range and which are not correlated to out-of-range power supply input deviations. Power supply output voltage deviations which are not correlated to power supply input voltage deviations are strongly indicative of a failing power supply.

The acceptable ranges for power supply input voltage, output voltage, and line current consumption will vary from computer to computer, and the multimeter chip can be configured to automatically recognize the acceptable ranges of the particular computer in which it resides. Upon detecting an out-of-range deviation, the multimeter time stamps data associated with the deviation and writes the data into the reliability card memory 44.

Fan fault detection circuitry 46 receives data from the fan sensor 30 which monitors operation of the host computer cooling fan. If the rotational speed of the fan falls below a minimum threshold, the fan fault detection circuitry recognizes this condition as a failure. When the fan fault detection circuitry detects a failure in fan operation, it time stamps data associated with the failure and writes the failure data into the reliability card memory.

The application software 24 can be configured to recognize particular conditions detected by the fan fault detection circuitry as requiring execution of notification procedures. For instance, the software can be configured to recognize that any deviation of internal temperature from the range between 10 and 40 degrees Celsius requires remote notification of selected devices. If temperature data is read from the reliability card memory by the application software reflecting a temperature reading of 45 degrees Celsius, an entry is made into the error log memory 28 of the host computer 12. The application software can also be configured to trigger a message on the computer monitor 14, reflecting an internal temperature reading in excess of the threshold temperature and/or to transmit an SNMP message to a first remote computer 34 indicative of a temperature reading outside of the threshold range. A user of the host computer 12 is provided with the flexibility to determine which notification procedures should be executed in response to detection of a particular event, depending on the urgency associated with the event. This flexibility is exercised by a user by configuring the host application software to associate detection of a particular event with a particular notification routine.

In addition to the notification capabilities of the host computer, the reliability card 10 itself provides event notification options. In a preferred embodiment, a relay contact alarm output 48 includes a relay which can be opened and closed under the control of the host application software 24. When the relay contact alarm output is idle, the relay is in an open position. Because the card based relay can only accommodate modest current flow, it is connected to an alarm power relay in the external box in order to switch larger currents. Upon activation by the host application software, the relay is closed, thereby activating an alarm power relay in the external box 16. The alarm power relay enables a user to configure a local alarm system. The ability to configure a local alarm system provides a user with greater flexibility to interface specific annunciation devices, such as flashing lights or bells, with the host computer 12.

A service modem 50 on the reliability card 10 provides another means for providing notification of a detected event associated with host computer failure. Alternatively, the service modem can be located external to the reliability card. The service modem is of particular importance if the host computer does not reside on the LAN 18. The service modem can act as a substitute for the SNMP notification procedure to transmit an alarm message to the remotely located monitoring computer 36. Even if the host computer is connected to the LAN, the service modem provides an alternate notification capability in the event that the host computer 12 is not able to communicate over the LAN. Furthermore, the service modem can provide a direct connection to a service provider which provides maintenance to the host computer. The application software can be configured to initiate a call-out from the service modem in the event of a detected event which requires urgent attention.

A preferred embodiment of the reliability card further includes a plain old telephone service (POTS) line interface 58 which allows access by a remote device over the PSTN to event detection data stored in the reliability card memory 44. The POTS line interface is configured to request a security code upon receiving a call. If the remote device placing the call is an analog telephone 62, the security code will be transmitted in the form of dual tone multifrequency (DTMF) signals. A text-to-voice conversion function can be integrated into a reliability card processor 60 to convert data in the reliability card memory into a voice format so that the user of the remote telephone can interact with the reliability card to obtain the event detection data. The remote telephone user is prompted to enter the security code by a voice message which is accessed from the reliability card memory. The event detection data which is accessed by the POTS line interface upon receiving the security code is then converted to a voice format for transmission to the remote telephone. Alternatively, the function of the POTS line interface can be performed by a basic rate interface (BRI) card for connection to an integrated services digital network (ISDN).

A remote reboot control 56 is able to reboot the host computer 12 in response to a reboot command received over the POTS line interface 58 or via the host computer LAN card 26. The first computer 34 on the LAN 18 is able to initiate a reboot of the host computer via the LAN card by instructing the host computer processor 22 to enable the remote reboot control via a serial port 40 of the reliability card. When the remote reboot control is activated, it momentarily opens the reboot power relay in the external box, thereby momentarily cutting off the power supply to the host computer 12. Access to the remote reboot control via the POTS line interface can provide a backup in the event that a host computer malfunction prevents access to the remote reboot control via the LAN. The processor 60 can be configured to cause the POTS line interface 58 to transmit an option to reboot the host computer along with event detection data requested by the remote telephone user.

A power supply control 54 on the reliability card is connected to a redundant power supply in the external box 16 associated with the host computer. As previously noted, an out-of-range deviation in power supply output voltage which is not correlated to an out-of-range power supply input voltage deviation is a strong indication of a failing power supply. When the host application software 24 reads data that is suggestive of a power failure, it enables the power supply control to switch the power supply from a primary to a secondary power supply. Both the primary and secondary power supplies have standard form factors.

An uninterruptible power supply (UPS) 55 can be provided for use during power failures as a backup power supply. Advanced UPSs typically will require a serial port connection for SNMP signaling. In a preferred embodiment, the reliability card 10 includes a UPS serial port 52 to provide the UPS with SNMP signaling capability. Although a standard serial card elsewhere in the host computer 12 can be utilized to provide the UPS serial port interface, including the UPS serial port on the reliability card preserves bus slots, which typically are a scarce resource.

Figure 4:
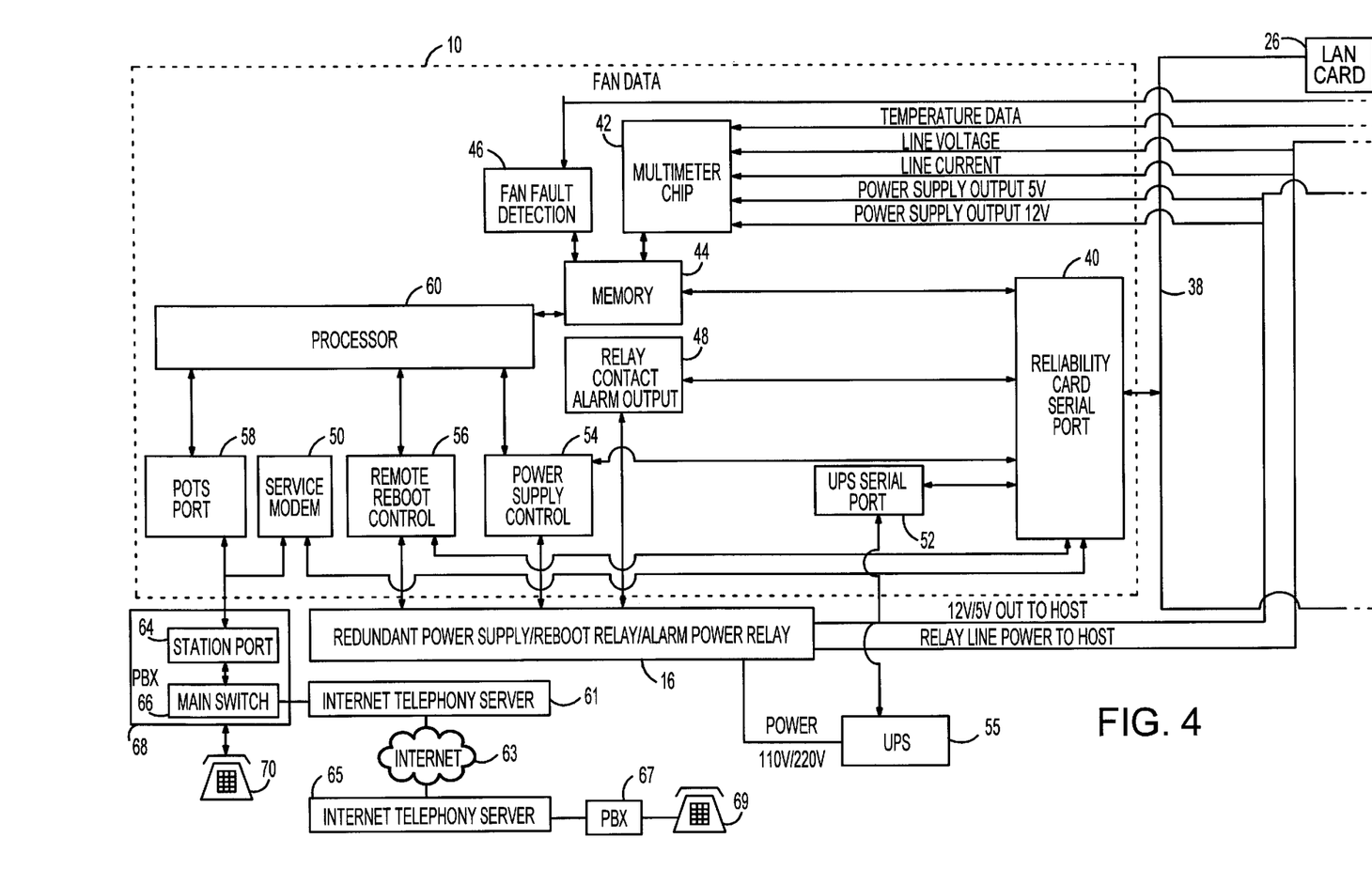
FIG. 4 is a block diagram of an embodiment of the reliability card for providing loopback test capability in a PBX.

Referring to FIG. 4, one embodiment of the reliability card 10 is employed to provide full loopback test capability of a PBX system 68 which does not have voice mail capability. Ordinarily, a full loopback test of a PBX will be performed by accessing the phone mail of a PBX. The reliability card POTS interface 58 is connected to the PBX station port 64. A call from a remotely located telephone 70 will be directed by a PBX main switch 66 to the station port connected to the POTS line interface. The POTS line interface answers the call. In response to a DTMF signal, the processor (with voice-to-text conversion capability) accesses voice information from the reliability card memory 44, converts the voice information into a voice format, and causes the reformatted voice information to be transmitted to the remote telephone. In this manner the reliability card provides a test port for the PBX able to answer the phone, play back speech, and respond to DTMF signals. The reliability card can also provide full loopback test capability for an Internet Protocol (IP) telephony call from a remote telephone 69 via a remote PBX 67. A remote internet telephony server 65 supports the call via a communications network 63, such as the Internet or an intranet. A local internet telephony server 61 supports the call at the local PBX 68.

Figure 5:
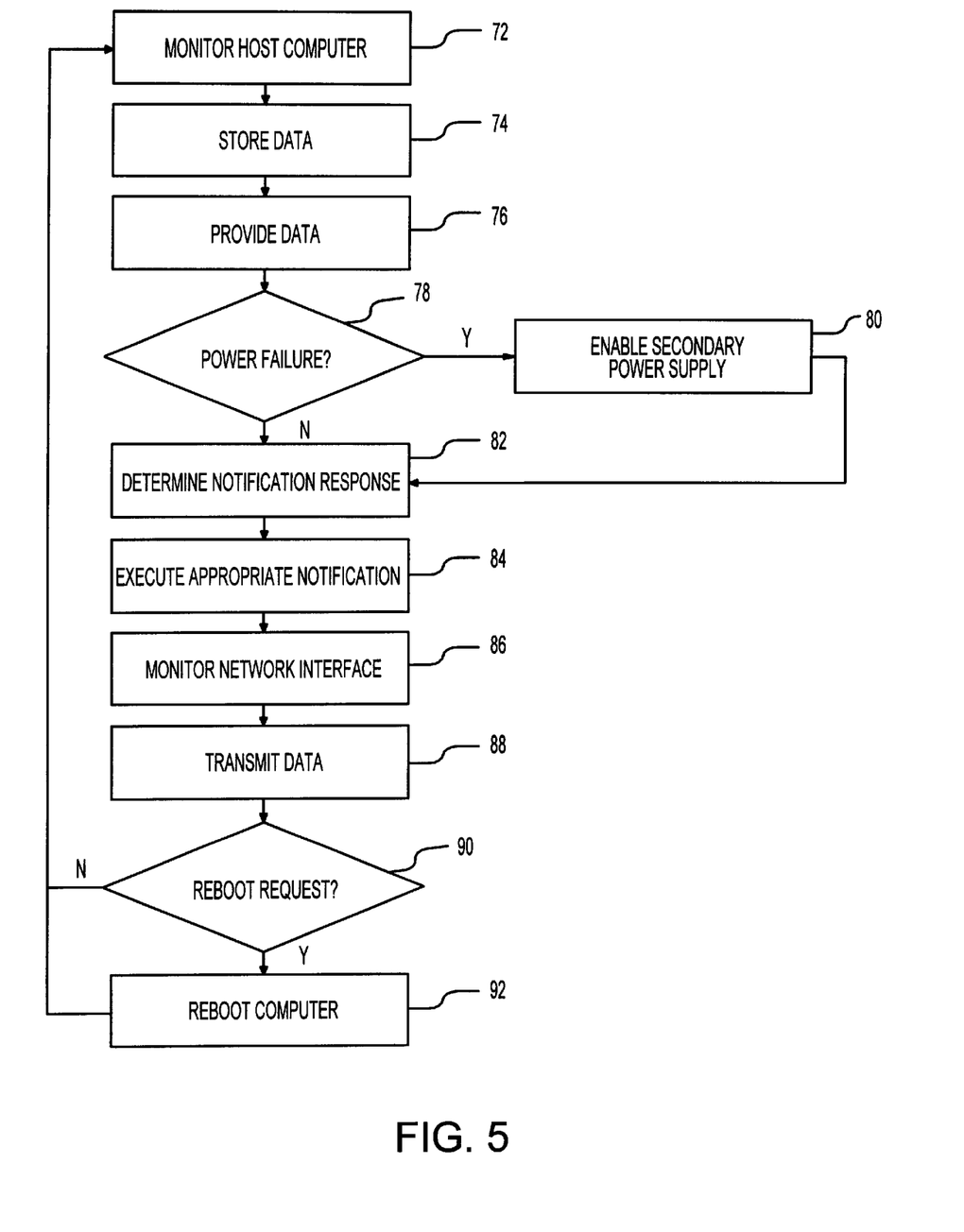
FIG. 5 is a process flow of a method for providing high reliability operation of the personal computer shown in FIG. 1.

With reference to FIG. 5, a method for providing high reliability operation in a host computer includes the step 72 of monitoring the host computer to detect predetermined events associated with host computer failure. Fan fault detection circuitry 46 of FIG. 3 monitors for operational failure of a cooling fan within the computer housing. The multimeter chip 42 monitors for out-of-range deviations in internal temperature of the host computer, out-of-range deviations in line voltage to the host computer, out-of-range deviations in line current consumption by the host computer, and out-of-range deviations in both 12 volt and 5 volt power supply output voltages which do not correspond with an out-of-range deviation in line voltage to the computer.

Upon detection of an event associated with host computer failure, for instance, excessively low 12V/5V output voltages data representative of the event is time stamped and entered into memory 44 on the reliability card in step 74. The event data is provided to the application software 24 in step 76, which reads the data and determines whether the data indicates that a power failure has occurred. This determination is made in decision step 78. If a power failure has occurred, the power supply control 54 is enabled in step 80 to switch from the primary power source to the secondary power source. Alternatively, both power supplies power the host computer and are individually monitored. When one power supply fails, the other supports the entire load until the defective unit is replaced.

In step 82 the application software determines the appropriate alarms which must be activated based on which events were detected. The application software has access to multiple alarms or notification procedures and a user of the host computer can configure the application software to execute specific notification procedures for each detected event according to the urgency associated with each event. An urgent event, such as detection of high internal temperature in the computer, might trigger execution of all possible notification procedures.

Figure 6:
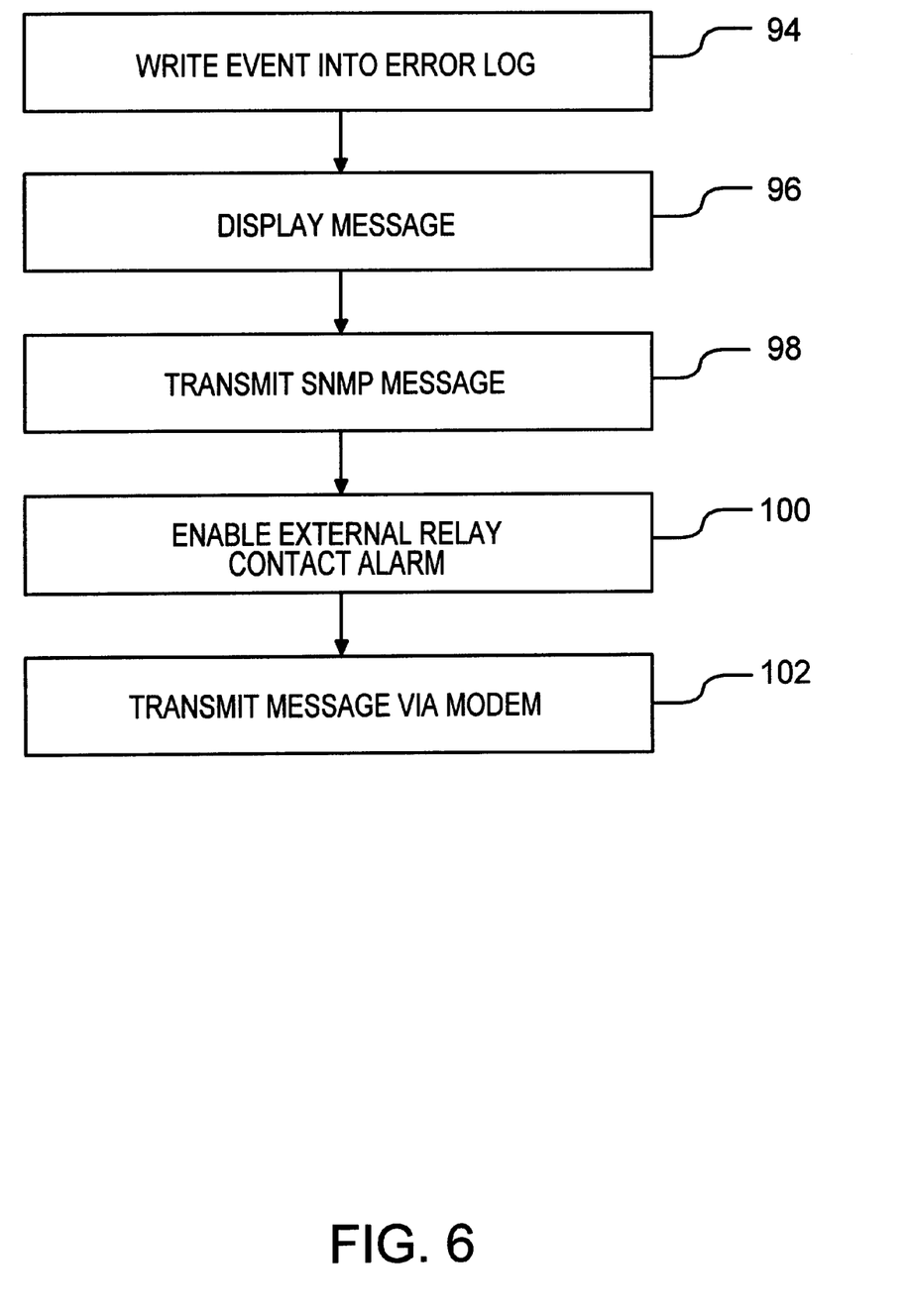
FIG. 6 is a process flow of illustrating one possible method for providing notification of an event detected by the reliability card illustrated in FIG. 3.

Referring to FIG. 6, an example of a method for performing a notification procedure in response to detection of an urgent event in the computer includes the step 94 of storing data associated with the event into the error log memory 28 of the host computer. Making an error log entry will likely occur upon detection of any event, in order to keep a record which can be accessed for diagnostic purposes. For low priority events, the error log entry might be the extent of the notification routine. In step 96, a message is displayed on the host computer monitor 14 representative of the detected event. In step 98, the host computer transmits an SNMP message over the LAN 18 to the first computer 34 and in step 100, the application software enables the external relay contact alarm. Finally, in step 102 the application software activates the service modem 50 to transmit an alarm message to the monitoring computer 36.

Returning to FIG. 5, in step 86 the POTS line interface is monitored for an event data request received from the remotely located telephone 62 over the PSTN 20. If the event data request is detected, a message is transmitted to the telephone in step 88, indicating which events have been detected. Advantageously, the POTS line interface can respond to the event data request even if the host computer is not operational because the processor 60 of the reliability card operates independently of the host computer processor 22. A prompt message is included with the event data message, which provides the user of the telephone with the option of requesting a reboot of the host computer. In step 90, the POTS line interface is monitored to determine if a reboot request is received. If no reboot request is received, the monitoring circuitry continues to monitor for the predetermined events. If a reboot request is received, the remote reboot control is activated and a reboot of the computer is performed in step 92. The process then returns to step 72.

What is claimed is:

1. A system for enabling continued operation of a host computer powered by a first host computer power supply, said system comprising:

an integrated reliability enhancement device connected for cooperative interaction with said host computer so as to maintain said host computer in an operational state, said integrated reliability enhancement device comprising:

(a) monitoring circuitry configured for recognizing a plurality of conditions associated with potential operational malfunctions of said host computer;

(b) redundant power supply control, responsive to said monitoring circuitry, configured to enable a second host computer power supply in response to detection by said monitoring circuitry of a failure of a first host computer power supply, said second host computer power supply being connected to supply power to said host computer;

(c) a remote reboot control configured to initiate rebooting of said host computer in response to a remotely generated reboot request when said second host computer power supply being connected to supply power to said host computer;

(d) means, responsive to said monitoring circuitry, for providing notification to a remote device upon detection by said monitoring circuitry of one of said conditions associated with said potential operational malfunctions of said host computer; and (e) memory having stored data representative of a history of said potential operational malfunctions, said memory being an internal and dedicated member of said integrated reliability enhancement device and being configured to provide said data to said host computer in response to a data request, said means for providing notification being responsive to command signals from said host computer to provide said notification to said remote device.

2. The system of claim 1 wherein said integrated reliability enhancement device is a printed circuit board having on-board electrical circuitry and wherein said means for providing remote notification includes a communications network interface, said memory being on-board memory and being responsive to a data request received via said interface to provide said potential malfunction data to said communications network interface for transmission over a communications network.

3. The system of claim 1 further comprising application software associated with said host computer for monitoring said memory for a presence of said malfunction data, said application software having a plurality of selectively enabled alarm modes wherein said alarm modes include (1) remote notification to a communication device of said potential malfunction, (2) entry of at least a portion of said malfunction data into a host computer error log, and (3) display of a message on a local data presentation device associated with said host computer.

4. The system of claim 1 wherein said means for providing remote notification includes means for accessing a service modem and an external alarm control, said enhancement device being an add-in card having an edge connector for connection to a bus slot of said host computer.

5. The system of claim 1 wherein said integrated reliability enhancement device further comprises a communications network interface, said remote reboot control being configured to receive said remotely generated reboot request via both a local area network (LAN) card of said host computer and said communications network interface on said integrated reliability enhancement device.

6. The system of claim 1 wherein said integrated reliability enhancement device further comprises:

memory having stored voice information;

an interface configured for connection to a station port of a private branch exchange (PBX) via a main switch of said PBX; and a processor responsive to test signals received from a remotely located communication device via said main switch to access said voice information from said memory for transmission to said remotely located communication device.

7. The system of claim 1 wherein said monitoring circuitry includes (1) fan fault detection circuitry configured to detect an operational malfunction of a cooling fan in said host computer, (2) temperature detection circuitry adapted for detecting a temperature in excess of a predetermined threshold temperature, (3) line voltage deviation detection circuitry configured to detect a deviation from a predetermined range in line voltage supplied to said host computer, (4) line current deviation detection circuitry configured to detect a deviation from a predetermined range of line current consumption by said host computer, and (5) power supply output voltage deviation detection circuitry configured to detect a deviation in power supply output voltage associated with a power failure.

8. A method for enabling continued operation of a host computer in a fault condition utilizing an integrated reliability enhancement device comprising the steps of:

utilizing monitoring circuitry of said integrated reliability enhancement device to monitor said host computer for predetermined events associated with host computer malfunctions;

storing event data representative of an occurrence of one of said predetermined events in local memory dedicated to said integrated reliability enhancement device, said local memory being an internal member of said integrated reliability enhancement device;

providing said event data to said host computer in response to a request generated by host computer application software;

utilizing a redundant power supply controller of said integrated reliability enhancement device to enable a second power supply which enables said host computer as a response to detecting said failure of said first external power supply; and performing remote notification of said occurrence of said event;

monitoring a communications port on said integrated reliability enhancement device for a remotely generated reboot request to reboot said host computer, said monitoring step including monitoring a first external power supply for a failure which disable said host computer; and initiating a rebooting procedure from said integrated reliability enhancement device in response to said remotely generated request if said reboot request is received.

9. The method of claim 8 wherein said step of initiating said rebooting procedure includes receiving said reboot request command via one of a LAN card of said host computer and a communications network interface on said integrated reliability enhancement device.

10. The method of claim 8 further comprising the steps of:

receiving said event data at said host computer;

entering at least a portion of said event data into an error log file in said host computer in response to receiving said event data; and transmitting a notification of said event occurrence from said host computer to a remotely located communication device.

11. The method of claim 8 further comprising the step of receiving a request for said event data from a remotely located communication device via a telecommunications network interface on said integrated reliability enhancement device, said step of performing said remote notification including transmitting said event data to said remotely located communication device via said communications network interface.

12. The method of claim 11 wherein said step of transmitting said event data includes providing an option to said remotely located communication device to transmit said reboot request.

13. A system for enabling continued operation of a host computer in a fault condition, said host computer being connected to receive power from first and second power supplies, said system comprising:

- a circuit card connected to a bus slot of said host computer, said circuit card including:
- first circuitry for detecting events associated with host computer failures;
- an event register operatively associated with said first circuitry for storing event data representative of a history of a potential operational malfunctions of said host computer, said event register being an internal and dedicated member of said circuit card and being configured to provide said event data to host computer in response to a data request;
- a communications interface in communication with said event register and with a communications network for transmitting notification of said event data via said communications network;
- an alarm control responsive to detecting at least one of said events to activate an alarm; and
- a power supply control associated with said first and second power supplies and configured to automatically enable said second power supply in response to detection by said first circuitry that said host computer is disabled by a failure of said first power supply; and
- a remote reboot control configured to initiate rebooting of said host computer in response to a remotely generated reboot request when said second host computer power supply being connected to supply power to said host computer.

14. The system of claim 13 wherein said event register is configured to provide said event data to said host computer in response to a data request, said alarm control being configured to activate said alarm in response to a command received from said host computer.

15. The system of claim 13 further comprising reboot control circuitry configured to receive reboot command signals via said communications interface.

16. The system of claim 13 further comprising host computer application software having multiple alarm modes responsive to detection of said events associated with said host computer failures, said alarm modes including (1) remote notification over a data network, (2) event data entry into a host computer error log, and (3) message display on a local data presentation device.

17. The system of claim 13 wherein said communications interface is configured for connection to a station port of a private branch exchange (PBX), said event register including voice data and being responsive to test signals received from a remotely located communication device via said PBX to provide said voice information to said communications interface for transmission to said remotely located communication device.

18. The system of claim 13 wherein said first circuitry is configured to monitor for a host computer cooling fan failure, a deviation of host computer internal temperature from a predetermined range, and a host computer power supply failure.

* * * * *